United States Patent [19]
Lee et al.

[11] Patent Number: 6,039,929
[45] Date of Patent: Mar. 21, 2000

[54] SYNTHESIS OF MONOCLINIC CELSIAN

[75] Inventors: Ilzoo Lee, Stevenson Ranch, Calif.; Josephine Covino, Vienna, Va.

[73] Assignee: The United States of America as represented by the Secretary of the Navy, Washington, D.C.

[21] Appl. No.: 08/990,261

[22] Filed: Dec. 15, 1997

[51] Int. Cl.[7] .......................... C01B 33/24; C01B 33/26
[52] U.S. Cl. ..................... 423/328.2; 423/330.1; 423/331; 501/125; 501/128
[58] Field of Search ............... 423/328.2, 330.1, 423/331; 501/125, 128

[56] References Cited

U.S. PATENT DOCUMENTS

| H626 | 4/1989 | Covino | 501/12 |
|---|---|---|---|
| 3,959,172 | 5/1976 | Brownwell et al. | 501/12 |
| 4,994,419 | 2/1991 | Talmy et al. | 501/128 |
| 5,041,400 | 8/1991 | Talmy et al. | 501/125 |
| 5,262,362 | 11/1993 | Covino-Hrbacek | 501/12 |
| 5,516,388 | 5/1996 | Moran et al. | 156/89 |
| 5,538,925 | 7/1996 | Talmy et al. | 501/8 |
| 5,578,534 | 11/1996 | Talmy et al. | 501/32 |
| 5,641,440 | 6/1997 | Talmy et al. | 264/681 |
| 5,642,868 | 7/1997 | Talmy et al. | |
| 5,695,725 | 12/1997 | Talmy et al. | 423/133 |

OTHER PUBLICATIONS

O'Bannon, Loran S. Dictionary of Ceramic Science and Engineering, p. 51, 1984.

I. Lee and J. Covino, "Sol–Gel Synthesis of BaO–Al2O3–SiO2 Ceramic," Mat. Res. Bull., vol. 29, 55, 1994 (No Month).

*Primary Examiner*—Mark L. Bell
*Assistant Examiner*—David Sample
*Attorney, Agent, or Firm*—Gregory M. Bokar; David S. Kalmbaugh

[57] ABSTRACT

A process for producing monoclinic celsian comprising the steps of forming a mixture of an alkoxide of silica, an alkoxide of aluminum, and a salt of barium; adding a catalyst of a fluorine containing compound to the mixture; calcining the catalyzed mixture; and, heat treating the calcined mixture. This process uses a sol-gel process to progressively increase the amount of monoclinic phase in relation to the hexagonal celsian. Additionally, a process for producing monoclinic strontium aluminosilicate is disclosed.

1 Claim, 4 Drawing Sheets

SYNTHESIS OF MONOCLINIC CELSIAN

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

MICROFICHE APPENDIX

Not Applicable.

BACKGROUND OF THE INVENTION

1. Field of the Invention

The present invention relates to the synthesis of ceramic structures and more particularly, to the synthesis of ceramic structures of barium aluminum silicates (BAS). Still more particularly, this invention relates to the formation of monoclinic celsian (BaO.$Al_2O_3$.2$SiO_2$) using a fluorine catalyzed sol-gel process. Additionally, the present invention relates to the synthesis of monoclinic SrO.$Al_2O_3$.2$SiO_2$(SAS) structures.

2. Description of the Related Art

Monoclinic celsian (BaO.$Al_2O_3$.2$SiO_2$) materials are known for a combination of high melting point, low thermal expansion, high thermal shock resistance, low and thermally stable dielectric thermal expansion of $2.29 \times 10^{-6}$/° C. (at 20° C. to 1000° C.), bending strength up to 110 MPa, and dielectric constant of $6-7 \times 10^{-4}$ and loss tangent of $1-2 \times 10^{-4}$ at 600° C. These ceramics may be prepared from natural materials, such as kaolin or clay, or technical grade starting materials containing significant amounts of impurities. However, impurities can adversely affect all properties, particularly the dielectric behavior of ceramics, especially at high temperatures.

The polymorphism of celsian is complex. Generally, monoclinic celsian is stable at temperatures less than 1590° C., whereas hexacelsian is stable at temperatures from 1590° C. to the melting temperature of 1760° C. Although the hexagonal structure is stable at temperatures above 1590° C., it tends to be the first product of solid phase reaction and has a strong tendency to persist metastably over the entire temperature range. Hexagonal celsian transforms reversibly into a low temperature orthorhombic form at 300° C. This transformation is accompanied by significant volume changes of approximately 3% to 4%, which significantly hinders most practical uses of hexagonal celsian in high temperature ceramic materials, especially thermal cycling applications.

Transformation of hexagonal celsian into monoclinic celsian is promoted by prolonged high temperature heating at greater than 1450° C., hydrothermal treatment at about 2 Kbar pressure, formation of glass phase during firing, and by the presence of impurities or the addition of certain additives, such as $B_2O_3$, LiF, $Cr_2O_3$, $CaF_2$, $ZrSiO_3$.

Monoclinic SrO.$Al_2O_3$.2$SiO_2$ (SAS), strontium aluminosilicate, has high refractoriness, low thermal expansion, low dielectric constant and loss tangent both stable over a broad range of temperatures and frequencies. SAS has a melting point of 1710° C. and exhibits similar polymorphism as BAS. SAS formation by solid phase reaction also is characterized by the primary appearance of a metastable hexagonal form, which is highly unstable in relation to BAS. Accordingly, preparation of monoclinic SAS does not present the problems encountered with the preparation of monoclinic BAS. A minimum temperature of 1550° C. has been needed to produce the ceramic materials of monoclinic BAS and monoclinic SAS. Attempts to reduce the minimum ceramic process temperature for monoclinic BAS, SAS, or BAS+SAS solid solution ceramic material firing temperatures with the use of sintering aids has previously destroyed the mechanical and dielectric properties of the final ceramic material.

Dielectric ceramics, electronic packaging, and structural ceramics are possible applications for BAS, SAS, and BAS+SAS.

The sol-gel process is a well-known technique which uses the hydrolysis of a metal-organic compound to form a sol in the preparation of metal oxides. Clusters of small particles of colloidal metal oxides in the sol gather together. As the size of these clusters increases, the clusters become sufficiently immobile to produce a viscous liquid, which further forms into a solid colloidal gel structure. The sol-gel technique has been applied to the preparation of both single component oxide glasses and multi-component oxide glasses.

In view of the foregoing, a method of making monoclinic celsian at lower temperatures for shorter heating times has been desired. Additionally, increased control of the quantity and purity has been desired for the composition of monoclinic celsian.

SUMMARY AND OBJECTS OF THE INVENTION

The present invention includes a process for producing monoclinic celsian comprising the steps of forming a mixture of an alkoxide of silica, an alkoxide of aluminum, and a salt of barium; adding a catalyst of a fluorine containing compound to the mixture; calcining the catalyzed mixture; and, heat treating the calcined mixture.

An additional aspect of the present invention includes a product of monoclinic celsian made by the process of forming a mixture of an alkoxide of silica, an alkoxide of aluminum, and a salt of barium; adding a catalyst of a fluorine containing compound to the mixture; calcining the catalyzed mixture; and, heat treating the calcined mixture.

In another aspect of the present invention, there is provided a process for producing monoclinic strontium aluminosilicate comprising the steps of forming a mixture of an alkoxide of silica, an alkoxide of aluminum, and an oxide of strontium; adding a catalyst of a fluorine containing compound to the mixture; calcining the catalyzed mixture; and, heat treating the calcined mixture.

The processes and product of the present invention are extremely valuable in the field of ceramic structures. Other and further advantages of the present invention are set forth in the description and appended claims.

DETAILED DESCRIPTION OF THE INVENTION

The present invention is a process for making monoclinic celsian and a product of monoclinic celsian from that process. The process eliminates undesired structures of BAS. The present invention lowers temperatures, shortens heating times and eliminates contaminating additives from previously known processes. Additionally, the present invention increases control of the quantity and purity of the resultant monoclinic celsian, enhancing the use of monoclinic celsian in electronic applications and in composites with other materials.

Figure 1:
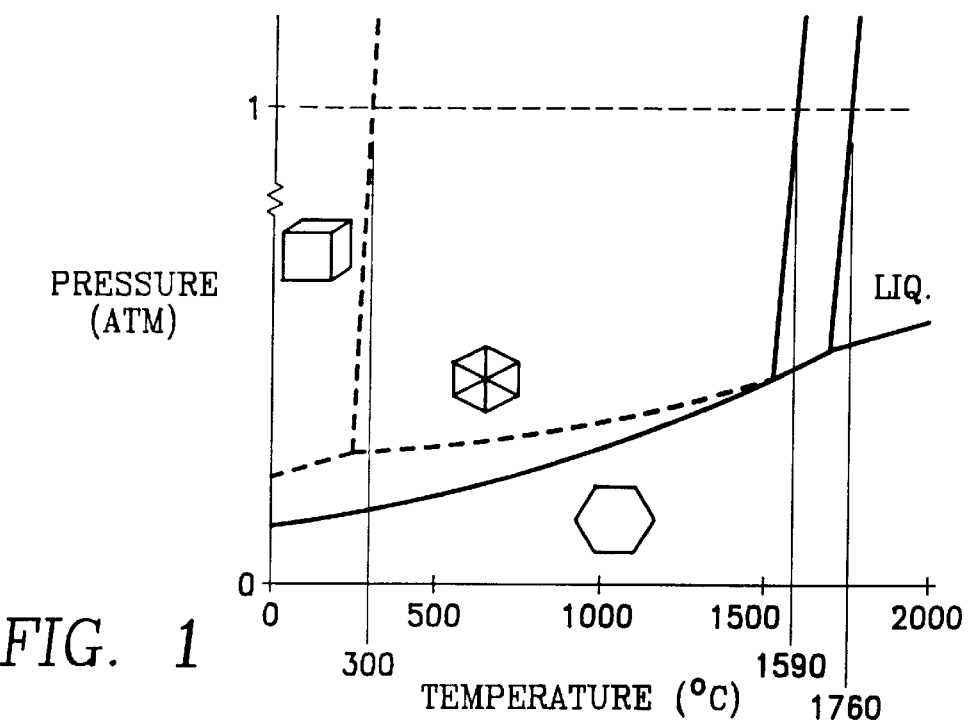
FIG. 1 is plot for the T-P phase diagram for stoichiometric BAS.

Referring to FIG. 1, the various ceramic structures of barium aluminum silicates (BAS) are shown in a temperature-pressure (T-P) phase diagram. Within this phase diagram, monoclinic celsian ($BaO.Al_2O_3.2SiO_2$) is shown as existing between 300–1590° C. over a range of pressures. Outside of this range, other forms of the BAS exist. Orthorhombic BAS forms below 300° C., and hexagonal celsian forms between 1590° C. and 1760° C. Above 1760° C., a liquid state exists.

Figure 2:
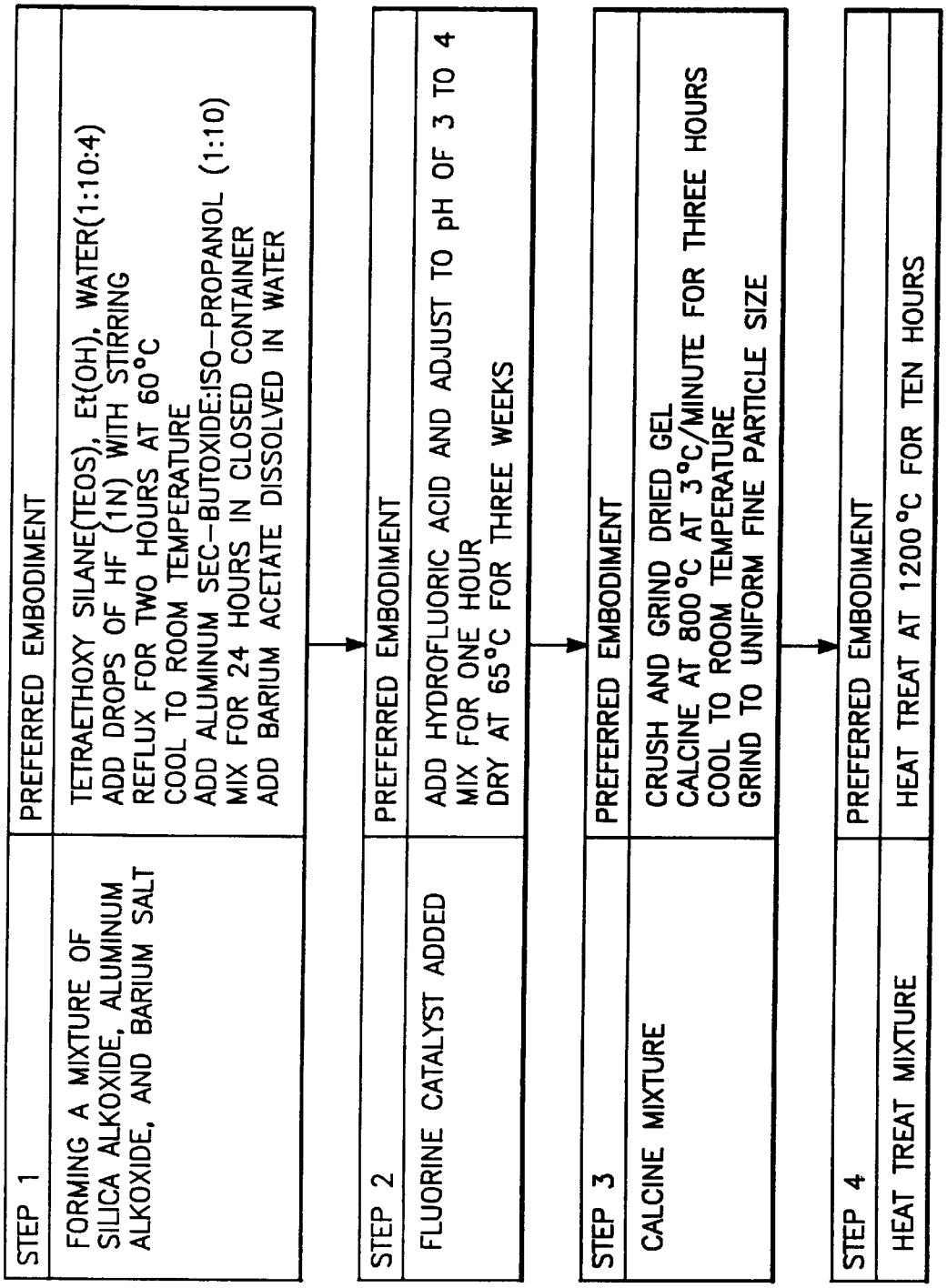
FIG. 2 is schematic illustration for the preferred embodiment of the synthesis of monoclinic BAS.

In FIG. 2, a flow chart showing steps for the production of monoclinic celsian, with the process of the preferred embodiment shown at each step. The process shown in the flow chart uses the sol-gel technique.

As seen in FIG. 2, the first step of the present invention begins with forming a mixture of a silica alkoxide, an aluminum alkoxide, and barium salt. Alkoxides of silica of the present invention include silicane iso-propoxide, tetramethoxy silane and tetraethoxy silane, preferably tetraethoxy silane. Alkoxides of aluminum include aluminum sec-butoxide and aluminum isopropoxide, preferably aluminum sec-butoxide. Barium salts include barium acetate and barium nitrate, preferably barium acetate. The amount of silica alkoxide, aluminum alkoxide and barium salt is proportional to the relative amounts of the silica, aluminum and barium materials in the resultant monoclinic celsian, being a ratio of 1:2:1, and may be determined by those skilled in the art.

In the preferred embodiment, the process begins with a dilute solution of tetraethoxy silane (TEOS), ethanol and water (1:10:4 molar ratio) in a vessel. The temperature of the solution is raised to approximately 60° C. The solution is partially hydrolyzed by adding a few drops of 1.0 N hydrofluoric acid (HF), as a gelling catalyst under constant stirring conditions. The solution is refluxed for approximately 2 hours at about 60° C., and then allowed to cool to room temperature. After this partial hydrolysis of TEOS, a solution of dilute aluminum sec-butoxide (ABS) and iso-propanol (1:10 molar ratio) is slowly added to the TEOS/ethanol mixture. The solution is stirred in a closed vessel for at least 24 hours at room temperature, with the solution changing from an initially slight cloudy appearance to a transparent and homogeneous solution. Barium acetate is dissolved in water and added to the solution.

As shown in FIG. 2, the second step of the present invention also has a fluorine compound which acts as a catalyst. The fluorine containing compound preferably contains a high amount of fluorine content. Accordingly, the fluorine containing compound includes any low molecular weight fluorine compound. Preferably, the fluorine compound comprises hydrogen fluoride compounds such as hydrofluoric acid, fluorocarbons such as Viton and Teflon, fluorinates, and the like. Most preferably, the fluorine compound is hydrofluoric acid. Preferably, the fluorine containing compound is added to the mixture of silica alkoxide, aluminum alkoxide, and barium salt mixture in an amount to provide a pH of from about 2.0 to about 5.0, more preferably from about 2.0 to 4.0, and most preferably from about 3.0 to about 4.0. In the preferred embodiment, the pH is adjusted to from about 3.0 to about 4.0 by adding HF, and stirred for about thirty minutes to about 1 hour, which dissolves the barium precipitates. The solution is placed in an air-circulated oven at from about 65° C. to about 70° C. for a period of from about 2 days to about 3 weeks, or by microwave and allowed to form a gel.

In the third step, shown in FIG. 2, the mixture of the silica alkoxide, an aluminum alkoxide, and barium salt with the fluorine compound is calcined at a temperature sufficient to remove organic residue from the catalyzed mixture. Preferably the temperature of calcination is from about 750° C. or greater, more preferably from about 800° C. or greater, even more preferably from about 800° C. to about 850° C., and most preferably from about 800° C. to about 825° C. The mixture is calcined to increase the purity of the mixture by removing by-products of the process of the organic residue materials. Heating rates for calcination are preferably from about 10° C./minute to about 1° C./minute, more preferably from about 5° C./minute to about 2° C./minute, and most preferably from about 3° C./minute to about 4° C./minute. Time periods for calcination are preferably from about 1 hours to about 5 hours, more preferably from about 2 hours to about 4 hours, and most preferably from about 3 hours to about 4 hours. In the preferred embodiment, the dried gel is crushed and ground to a uniform size with a mortar and pestle and calcined at approximately 800° C. to 825° C. at a heating rate of about 3° C./minutes to about 4° C./minute for approximately 3 to 4 hours in flowing air. Preferably after the calcination, the gelled mixture cooled to room temperature and again ground with a mortar and pestle into a uniform fine powder.

Once calcined, the catalyzed mixture is heat treated in a fourth step, as further seen in FIG. 2. The fine powder is heat treated at a temperature sufficient to form monoclinic celsian, preferably from about 1200° C. or more. The heat treatment lasts for a time sufficient to form monoclinic celsian, preferably from about 6 hours or more, more preferably from about 10 hours or more. The amount of monoclinic celsian formed is proportional to the time of heat treating the calcined catalyzed mixture. Accordingly, the product of monoclinic celsian varies by the time of heat treatment of the calcined catalyzed mixture of the process, giving various amounts of quantity and purity which may be regulated. The amount of time may be determined by those skilled in the art to produce the quantity and purity of monoclinic celsian desired. The monoclinic celsian appears after a heat treatment of approximately 6 hours at 1200° C. and the product is dominated with monoclinic celsian after a 1200° C. heat treatment of from about 10 hours or more.

EXAMPLE 1

In a three necked flask fitted with a reflux condenser, a dilute solution of tetraethoxy silane (TEOS) and ethanol (1:10 molar ratio) was prepared. This solution was partially hydrolyzed by adding a few drops of 1.0 N HF as a gelation catalyst under constant stirring conditions. The solution was refluxed for approximately 2 hours at about 60° C., and then allowed to cool to room temperature. After this partial hydrolysis of TEOS, a solution of dilute aluminum sec-butoxide (ABS) and iso-propanol (1:10 molar ratio) was slowly added to the TEOS/ethanol mixture. The solution was stirred in a closed vessel for at least 24 hours at room temperature, with the solution changing from an initially slight cloudy appearance to a transparent and homogeneous solution. Barium acetate dissolved in water was added to the solution. The pH was adjusted to from about 3.0 to about 4.0 by adding HF, and stirred for approximately 30 minutes. The solution was placed in an air-circulated oven at from about 65° C. to about 70° C. for a period of from about 2 days to about 3 weeks, and allowed to form a gel. The dried gel was then crushed and ground to a uniform size with a mortar and pestle and calcined at approximately 800° C. at a heating rate of about 3° C./minute for approximately 3 hours in flowing air. The calcined gel was again ground with a mortar and pestle into a fine powder of a particle size of from about 25 μm to about 70 μm. The gel showed relatively good homogeneity. The calcined HF catalyzed gel was heat treated at 1000° C. for 10 minutes, 1200° C. for 10 minutes, and 1200° C. for 10 hours.

EXAMPLE 2

Example 1 was repeated with exception that hydrochloric acid (HCl) was used in place of HF. The gel appeared to be heterogeneous with rod-shaped barium salt that had crystallized during drying, with smaller surface area than the HF gel. The calcined HCl catalyzed gel was heat treated at 1200° C. for 6 hours and 1200° C. for 10 hours.

EXAMPLE 3

Example 1 was repeated with exception that acetic acid was used in place of HF. The gel appeared to be heterogeneous with rod-shaped barium salt that had crystallized during drying, with smaller surface area than the HF gel. The calcined acetic acid catalyzed gel was heat treated at 1200° C. for 6 hours and 1200° C. for 20 hours.

The resultant compounds of examples 1–3 were compared. Thermogravimetric analysis (TGA, TA 2950) and differential scanning calorimeter (DSC) measurement were performed on the gels from room temperature to approximately 1400° C. at a heating rate of 10° C./min. Phase transition of the gels were monitored using differential thermal analyzer (DTA-SDT, TA 2960) as well as the DSC.

Figure 3:
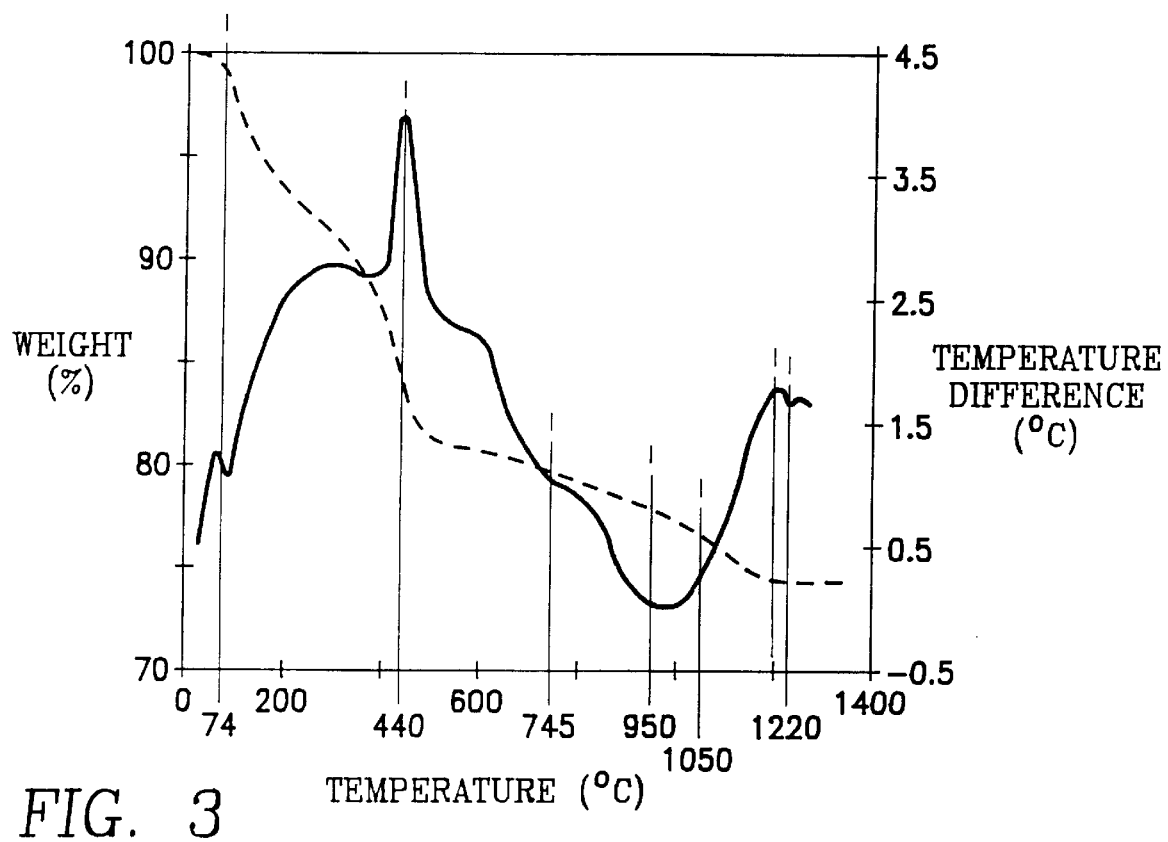
FIG. 3 is graph of the thermogravimetric analysis (TGA) and differential scanning calorimeter (DSC) of BAS catalyzed with HF.

DSC results for the three examples showed initial endothermic peaks between 100° C. to 200° C. due to the loss of weakly adsorbed molecules and exothermic peaks between 400° C. to 500° C. resulted from oxidation of residual alcohols. The exact position of the peaks and amount of thermal energy were dependent on the type of gel synthesized using different acid. TGA and DTA comparison of the HF, HCl and acetic acid gels showed a total weight loss of from about 20% to about 30% of the initial powder weight over the temperature range of 25° C. to 1000° C. However, the thermal analysis of the HF differed from the HCl and acetic acid catalyzed gels. FIG. 3 is a graph of the thermogravimetric analysis (TGA, TA 2950) and differential scanning calorimeter (DSC) of BAS catalyzed with HF. Thermal analysis of the gels was performed using a TA 2000 system. The thermogravimetric analysis was performed from room temperature to approximately 1400° C. Within the HF catalyzed gel, FIG. 3 shows evaporation of residual alcohol and water at 74° C., pyrolysis of residual organic groups followed by oxidation of residual carbon and organic condensation at 440° C., glass transition at 745° C., sintering at 950° C. to 1050° C., crystallization at 1200° C., and melting at 1220° C.

Figure 4A:
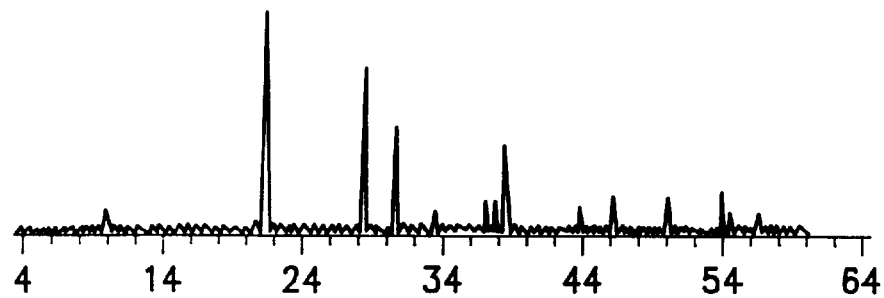
FIG. 4 is an x-ray diffraction pattern of BAS catalyzed with HCl and acetic acid; and, FIG. 5 is an x-ray diffraction pattern of BAS catalyzed with HF.
Figure 4B:
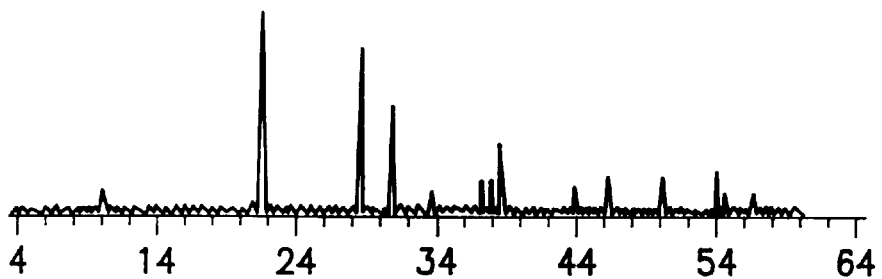
Figure 4C:
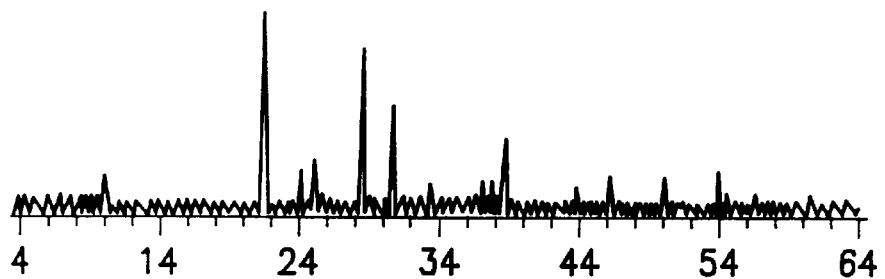
Figure 4D:
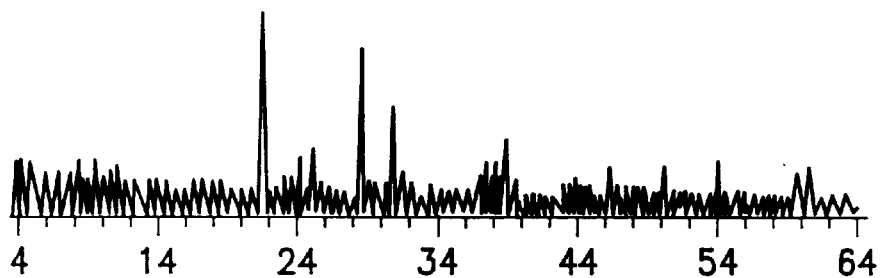
Figure 5A:
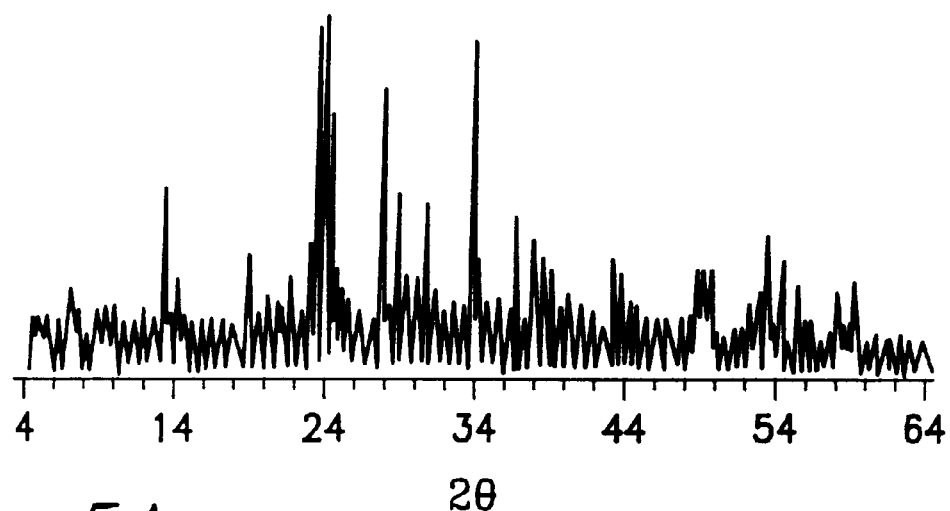
Figure 5B:
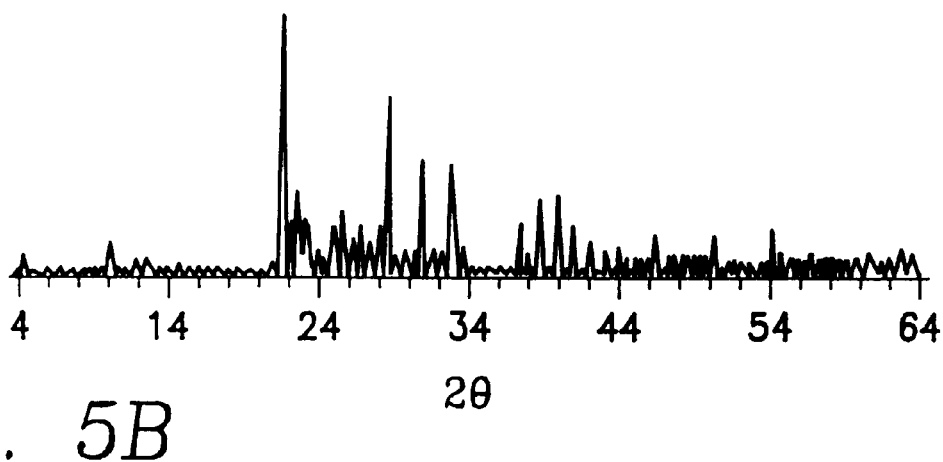
Figure 5C:
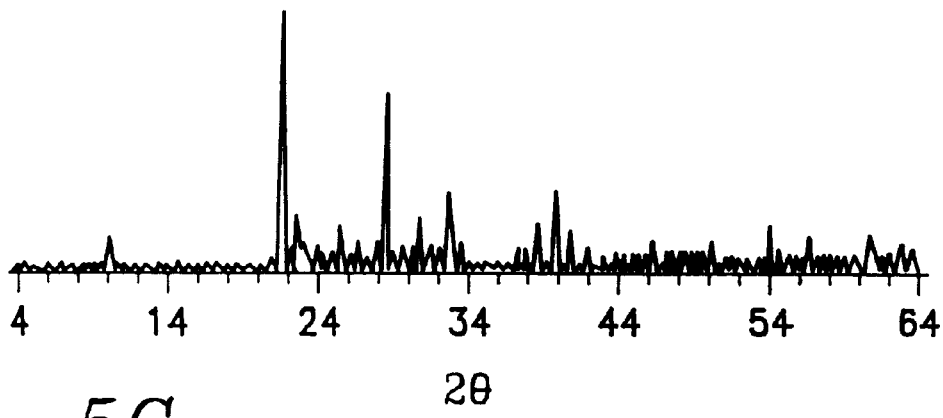

The amorphous nature of the heat treated gels were ascertained using an automated Scintag PAD V x-ray diffractometer. Heat-treatment experiments for each acid-catalyzed precursor powder were conducted at 1000° C., 1100° C., and 1200° C. Powders of each sample of 100 mesh were mounted on zero background quartz and scanned from a Bragg's angle of 2Θ=4 to 64 at a rate of 2 degrees/min using CuKα radiation. Secondary electron images of powdered samples were taken by Amray scanning electron microscope Model 1400. FIG. 4 shows x-ray diffraction pattern for the BAS catalyzed with HCl and acetic acid in which the hexagonal phase forms even after extensive heat treatment. FIG. 4A shows BAS catalyzed with acetic acid at 1200° C. for 20 hours. FIG. 4B shows BAS catalyzed with acetic acid at 1200° C. for 6 hours. FIG. 4C shows BAS catalyzed with HCl at 1200° C. for 10 hours. FIG. 4D shows BAS catalyzed with HCl at 1200° C. for 6 hours. The diffraction pattern was examined with Journal of Crystalography Powder Diffraction Spectra (JCPDS) files for monoclinic and hexagonal celsian. The peaks marked with the open circle (○) are indications of the presence of hexagonal celsian. Evidence of monoclinic celsian was not found. As seen in FIG. 5, X-ray diffraction patterns for HF catalyzed gels showed mixtures of monoclinic celsian and hexagonal celsian phases, with progressive increases in monoclinic celsian as heat treatment time increased. FIG. 5A shows BAS catalyzed with HF at 1200° C. for 10 hours. FIG. 5B shows BAS catalyzed with HF at 1200° C. for 10 minutes. FIG. 5C shows BAS catalyzed with HF at 1000° C. for 10 minutes. The open circles indicate the presence of hexagonal celsian and the filled circles (●) indicate the presence of monoclinic celsian. Monoclinic celsian was evident when the sample was heat treated at 1200° C. for 6 hours and dominated the x-ray powder pattern after from about 10 to about 12 hours of annealing at 1200° C.

Additionally, a present invention is the similar process for the producing monoclinic strontium aluminosilicate comprising the steps of forming a mixture of an alkoxide of silica, an alkoxide of aluminum, and an oxide of strontium; adding a catalyst of a fluorine containing compound to the mixture; calcining the catalyzed mixture; and, heat treating the calcined mixture. Compound equivalence between $BaO.Al_2O_3.2SiO_2$ and $SrO.Al_2O_3.2SiO_2$ is known [see for example, U.S. Pat. Nos. 5,538,925 and 5,578,534 (Talmy et al.), incorporated herein by reference]. Accordingly, similar results for the production of monoclinic SAS, as for monoclinic BAS, are expected. Strontium oxide precursor include strontium oxide (SrO) and strontium carbonate ($SrCO_3$). The optimum amounts of silica alkoxide, aluminum alkoxide, and strontium oxide materials are proportional to the relative amounts of the elements in the monoclinic SAS, being 2:2:1, and may be determined by those skilled in the art.

It should be understood that the foregoing summary, detailed description, examples and drawings of the invention are not intended to be limiting, but are only exemplary of the inventive features which are defined in the claims.

What is claimed is:

1. A process for producing monoclinic strontium aluminosilicate comprising the steps of:
   (a) forming a mixture of an alkoxide of silica, an alkoxide of aluminum, and an oxide of strontium;
   (b) adding a catalyst of a fluorine containing compound to the mixture;
   (c) calcining the catalyzed mixture; and,
   (d) heat treating the calcined mixture effective to form monoclinic strontium aluminosilicate.

* * * * *